United States Patent
Hoefer

(12) 
(10) Patent No.: US 6,563,878 B1
(45) Date of Patent: May 13, 2003

(54) METHOD OF AND APPARATUS FOR GENERATING PCM CODE SETS

(75) Inventor: Gerald Hoefer, Langerringen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/364,575

(22) Filed: Jul. 30, 1999

(30) Foreign Application Priority Data

Jul. 30, 1998 (EP) ............................................. 98114325

(51) Int. Cl.⁷ .......................... H04B 14/04; H04B 1/38; H04B 5/16; H04Q 11/00
(52) U.S. Cl. ...................... 375/242; 375/222; 370/383; 370/523; 379/399.01; 341/106
(58) Field of Search .......................... 341/106; 370/292, 370/376, 383, 523, 540; 375/222, 223, 243, 265, 280, 286, 296; 379/3, 22.03, 1.04, 100.05, 221.09, 435, 406.05; 455/76, 522; 725/106, 114

(56) References Cited

U.S. PATENT DOCUMENTS

| | | | | |
|---|---|---|---|---|
| 3,902,165 A | * | 8/1975 | Artom | 370/383 |
| 5,825,823 A | * | 10/1998 | Goldstein et al. | 375/286 |
| 6,163,570 A | * | 12/2000 | Olafsson | 375/223 |
| 6,327,301 B1 | * | 12/2001 | Demjanenko et al. | 375/222 |

FOREIGN PATENT DOCUMENTS

| EP | 0 833 481 A1 | 4/1998 |
|---|---|---|
| EP | 0 871 303 A2 | 10/1998 |
| EP | 0 876 030 A2 | 11/1998 |

OTHER PUBLICATIONS

International Publication No. WO 96/18261 (Townshend), dated Jun. 13, 1996.
International Publication No. WO 98/37657 (Townshend), dated Aug. 27, 1998.
"A Digital Modem and Analogue Modem Pair for Use on the Public Switched Telephone Network (PSTN) at Data Signaling Rates of up to 56000 BIT/S Downstream and up to 33600 BIT/S Upstream". ITU 1998, pp. 1–50.
International Publication No. WO 98/32257 (Forney), dated Jul. 23, 1998.

* cited by examiner

Primary Examiner—Stephen Chin
Assistant Examiner—Edith Yeh
(74) Attorney, Agent, or Firm—Laurence A. Greenberg; Werner H. Stemer; Ralph E. Locher

(57) ABSTRACT

A method is disclosed for generating a PCM code set for encoding data by a PCM encoder in a data transmission system having a digital modem with a PCM encoder, a digital signal transmission path, an analogue signal transmission path with a central office line interface portion, and an analogue modem. The method includes the step of determining a minimum signal level distance between adjacent PCM codes of the PCM code set, the minimum signal level distance enabling discrimination by the analogue modem. Then a line interface attenuation of the central office line interface portion is determined. Finally, the PCM code set on the basis of a power limit computed by adding the line interface attenuation to a central office line interface power limit is generated. The invention further relates to an analogue modem to be operated in such a data transmission system.

7 Claims, 2 Drawing Sheets

METHOD OF AND APPARATUS FOR GENERATING PCM CODE SETS

BACKGROUND OF THE INVENTION

Field of the Invention

The invention relates to a method of generating a pulse code modulation (PCM) code set for encoding data by a PCM encoder in a data transmission system. The data transmission system contains a digital modem having the PCM encoder, a digital signal transmission path, an analogue signal transmission path having a central office line interface portion, and an analogue modem for generating the PCM code set for encoding data by the PCM encoder. The invention further relates to an apparatus for carrying out such a method.

Recently, substantial progress has been made in increasing the data transmission rates when transmitting data over conventional analogue telephone lines. The International Telecommunications Union (ITU) has promulgated and published various recommendations, such as V.32, V.32bis, or V.34, that are concerned with data transmission over telephone lines. These recommendations are all based on a transmission technique called quadrature amplitude modulation (QAM). QAM has proven advantageous for the plain old telephone system (POTS) environment.

Nevertheless, the network of telephone systems has undergone massive changes in that the network is nowadays almost entirely digital. The analogue signals originating from a first subscriber modem are converted at the central office of the subscriber to digital representations that are carried through the digital telephone network. At the central office of a second subscriber, the digital signals are converted back into analogue signals to be driven into a subscriber line of the second subscriber. The modem of the second subscriber interprets the analogue signals on the analogue subscriber line by demodulating the QAM signals produced by the modem of the first subscriber. The same way of data communication is carried out in the reverse direction.

Increasingly more subscribers are connected to the telephone network through a digital subscriber interface, such as ISDN. Thus, many data connections are established between a first subscriber having an analogue network interface and a second subscriber having a digital network interface. In many cases, the second subscriber will be an internet service provider. In order to optimize data transmission over such heterogeneous communication channels, various proposals have been made in the recent past. One such proposal is known from International Patent Application WO 96/18261.

The proposal is based on the idea that the transmission rate in a heterogeneous communication channel from the digital subscriber to the analogue subscriber, maybe raised by using the PCM coding technique instead of the former QAM modulation techniques. The PCM coding technique uses a plurality of signal levels for encoding data symbols (each data symbol containing multiple bits). These signal levels are again recognized by the receiving modem that is then able to decode the data symbol encoded into the signal levels.

Further, the ITU has published a draft for a new recommendation V.90 on May 6, 1998. The new recommendation also relies on the PCM coding technique for the transmission of data from the digital subscriber to the analogue subscriber. Draft recommendation V.90 in terms of its PCM coding scheme depends on ITU-T recommendation G.711 describing Pulse Code Modulation (PCM) of Voice Frequencies which is generally applied in telephone networks throughout the world when converting analogue signal amplitude values into numeric representations thereof, and vice versa. G.711 recommends two PCM coding schemes generally known as $\mu$-law, which is applied in North American telephone networks, and A-law, which is applied in most other telephone networks. Both coding schemes have in common that they have a logarithmic coding characteristic, i.e. the lower the signal amplitude value to be encoded, the more fine-grain the available PCM codes. Such logarithmic coding characteristic has been found to be particularly advantageous for encoding analogue voice signals at minimum distortion.

Recommendation G.711 makes available 256 PCM codes (or U-codes as they are called in the draft of V.90) which are grouped into eight positive and eight negative segments (or U-chords as they are called in the draft of V.90). Each PCM code is encoded using eight bits. Due to power restrictions on the analogue telephone line and due to line impairments, the analogue modem (according to the terminology used in the draft to V.90) receiving analogue amplitude values is unable to discriminate between all 256 available PCM codes. Therefore, a reduced set of PCM codes is determined for encoding data symbols during the set-up of a data communication channel under real world conditions. This accordingly lowers the data transmission rate down from the maximum theoretical possible value of 64 kbit/s such that it is not above 56 kbit/s.

Measurements on existing V.90 modems show that the actual data rate for the PCM transmission path from the digital modem to the analogue modem is even considerably below the expected 56 kbit/s. Published, European Patent Application EP 0 833 481 A1 suggests that an attenuation in any analogue transmission path has to be compensated for. However, the European Patent Application EP 0 833 481 fails to set out in detail how such compensation is supposed to be accomplished.

SUMMARY OF THE INVENTION

It is accordingly an object of the invention to provide a method of and an apparatus for generating PCM code sets that overcome the above-mentioned disadvantages of the prior art methods and devices of this general type, in which the data transmission rate in a communications system using a PCM data encoding technique is enhanced.

With the foregoing and other objects in view there is provided, in accordance with the invention, an improved method of generating a pulse code modulation code set for encoding data with a PCM encoder in a data transmission system having a digital modem with the PCM encoder, a digital signal transmission path, an analogue signal transmission path with a central office line interface portion, and an analogue modem, the improvement which includes:

determining a minimum signal level distance between adjacent PCM codes of the PCM code set, the minimum signal level distance enabling discrimination by the analogue modem for determining a line interface attenuation of the central office line interface portion; and generating the PCM code set on a basis of a power limit computed by adding the line interface attenuation to a central office line interface power limit.

In the invention, the minimum signal level distance between adjacent PCM codes of the PCM code set is determined. The minimum signal level distance is the level distance between successive symbols that can be safely discriminated by the analogue modem of the communications system. Then, the line interface attenuation of the central office line interface portion of the communications system is determined. Eventually, a PCM code set is generated on the basis of a power limit computed by adding line interface attenuation to the central office line interface power limit.

Output power limits are generally to be observed at the line interface terminal output to the subscriber telephone line. Telephone operators set their own power limits depending on various properties of the network. For this reason, the central office line interface for each subscriber line includes attenuation capabilities to make sure that power limits are within specified limits. The invention compensates for the attenuation introduced by the attenuators at the central office line interface. The digital modem of the communications system may then generate a PCM code set that is close to the power limit measured at the output of the central office line interface to the subscriber line. This allows for more PCM codes to be included in a particular PCM code set and thus results in higher data transmission rates from the digital modem to the analogue modem.

In a preferred embodiment of the invention, the line interface attenuation is computed by measuring the total attenuation of the signal path from the digital modem to the analogue modem and by subtracting therefrom an attenuation value caused by the line interface of the analogue modem and an estimate of an attenuation value caused by a line portion of the analogue signal transmission path. The result is compared with values contained in a look-up table. The look-up table includes values of expected attenuation values for the line interface attenuation prescribed by various network operators. The nearest table value is taken as a basis for computing an adapted PCM code set according to the invention. By a measurement of attenuation values and a comparison, it is possible to substantially improve the PCM coding efficiency and thus the obtainable data transmission rate.

In a further preferred embodiment, output power limits of the central office line interface are stored in a look-up table. In yet another preferred embodiment, the method is carried out by the analogue modem. This is particularly advantageous in a data transmission system according to the would-be recommendation V.90. Signals transferred in phase two of communication start-up signals and sequences can be utilized to measure the total attenuation to which a signal from the digital modem to the analogue modem is subjected.

An embodiment of the analogue modem according to the invention includes means for determining a minimum signal level distance between adjacent PCM codes of the PCM code set. The signal minimum signal level distance enables discrimination by the analogue modem. The analogue modem further includes means for determining a line interface attenuation of the central office line interface portion and a PCM code set generator for generating the PCM code set on the basis of the power limit computed by adding the line interface attenuation to a central office line interface power limit.

A preferred embodiment of the modem further includes a table including line interface attenuation values respectively prescribed by a plurality of central office operators. A still further preferred embodiment of the modem includes a table including power limit values respectively prescribed by a plurality of central office operators.

Other features which are considered as characteristic for the invention are set forth in the appended claims.

Although the invention is illustrated and described herein as embodied in a method of and an apparatus for generating PCM code sets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2a is a diagram showing a PCM code set measured in the prior art analogue modem during a data communication; and FIG. 2b is a diagram showing the PCM code set obtained according to the invention.

DESCRIPTION OF THE PREFERRED EMBODIMENTS

Figure 1:
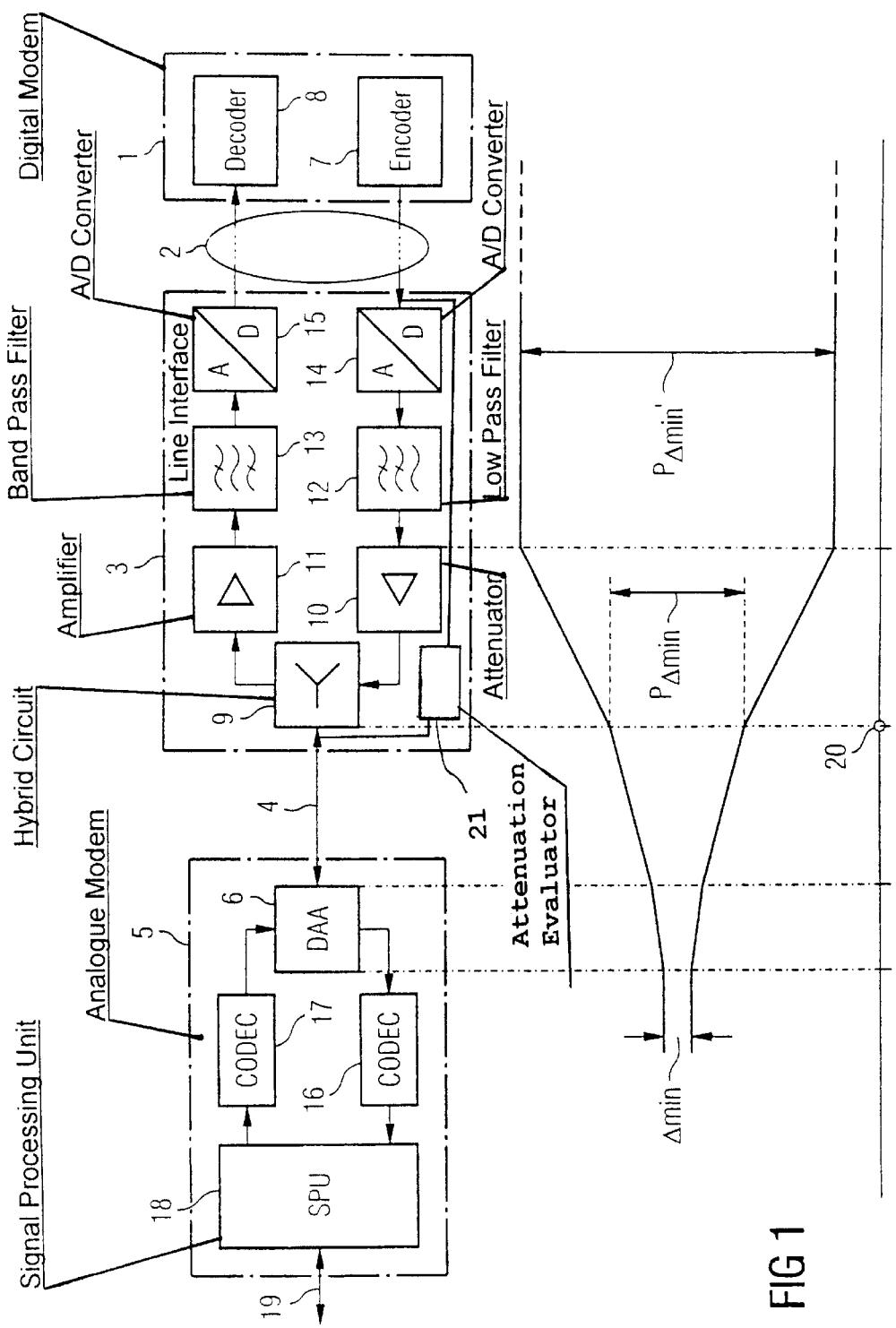
FIG. 1 is a diagrammatic, block circuit diagram of a communications system and attenuation values imposed by major circuit elements according to the invention.

In all the figures of the drawing, sub-features and integral parts that correspond to one another bear the same reference symbol in each case. Referring now to the figures of the drawing in detail and first, particularly, to FIG. 1 thereof, there is shown in its upper half a circuit diagram of a communications system according to the would-be standard V.90. There is provided a digital modem 1 that is connected to a digital signal transmission network 2 as one of its subscribers. The digital modem 1 contains a decoder 8 for decoding signals received by the digital modem 1 and an encoder 7 for encoding data to be transmitted by the digital modem 1. The digital modem 1 is further connected with a non-illustrated data processing device which acts as a data sink and source, respectively, for data handled by the digital modem 1.

The digital signal transmission network 2 ensures that data is transmitted to and from the digital modem 1 in a transparent fashion when the digital modem 1 is in data communication with another subscriber being connected to the digital transmission network 2. The digital signal transmission network 2 is typically a digital telephone network to which subscribers are connected through both digital and analogue interfaces.

The communications system of FIG. 1 further depicts a line interface 3 which functions as the interface between the digital signal transmission network 2 and an analogue subscriber line 4. The analogue subscriber line 4 provides two-way communication over a two-wire line pair. Typically, the line interface 3 is accommodated in a central office together with a plurality of other line interfaces of similar type for a plurality of other subscribers.

A hybrid circuit 9 is included in the line interface 3 for separating communications directions into two signal paths. In an upstream direction (from the analogue portion to the digital signal transmission system 2), there is provided an amplifier 11, a band-pass filter 13, and an analogue-to-digital (A/D) converter 15. The A/D converter 15 further includes encoding devices for encoding analogue signals according to the ITU-T recommendation G.711 and for supplying the encoded signals to the digital signal transmission system 2.

In a downstream direction (from the digital transmission system 2 to the analogue portion), there is provided an A/D converter 14, a low-pass filter 12, and an attenuator 10. The A/D converter 14 further includes decoding capabilities for receiving encoded digital signals from the digital signal transmission system 2 and for decoding digital signals according to the ITU-T recommendation G.711.

At the end of the analogue subscriber line 4 opposite the line interface 3, there is connected an analogue modem 5. The analogue modem 5 contains a direct access arrangement (DAA) 6 providing the functions of 2-wire to 4-wire conversion (similar to the hybrid 9 in the line interface 3) and high-bit-rate digital-to-analogue conversion. In the downstream path, a codec 16 is coupled to the DAA 6 in order to convert the signal supplied by the DAA 6 into a signal that is compliant with the ITU-T recommendation G.711. A similar codec 17 is coupled to the DAA 6 in the upstream path. Both of the codecs 16 and 17 are coupled to a signal processing unit (SPU) 18 which performs signal processing in terms of modulation and demodulation in the upstream and downstream paths, respectively. The SPU 18 is coupled to a is data sink and source (not shown in FIG. 1) via a bi-directional data line 19.

The lower half of FIG. 1 depicts an attenuation of a signal originating from the digital modem 1 and received by the analogue modem 5. The diagram illustrates the point of finding the minimum signal level distance Amin between adjacent PCM codes. In the course of the signal traveling to the analogue modem 5, it is subjected to various attenuation steps in the analogue portion of the transmission path which have to be accounted for. A first attenuation is introduced by portions of the line interface 3, particularly the attenuator 10, a second attenuation is introduced by the subscriber line 4, and a third attenuation is introduced by the DAA 6. A minimum signal level distance of Amin corresponds to a power level of $P_{\Delta min}$ at reference point 20. The same minimum signal level distance corresponds to a power level of $P_{\Delta min}'$ on the side of digital transmission system 2. According to the would-be recommendation V.90, the minimum signal level distance Amin forms the basis for generating a particular PCM code set to be used by the digital modem 1 for encoding data.

On the other hand, the generation of code sets is further limited by an output power limit of the line interface 3 at the reference point 20. The power limit is imposed by telephone network operators. While known modem systems constrain themselves to determining the power limit at the output of the encoder 7 of the digital modem 1, the invention seeks to overcome this constraint by allowing a higher power limit at the output of the encoder 7 of the digital modem 1. This is possible when taking into account the attenuation factor introduced by the line interface 3 which lowers the power level received from the encoder 7 of the digital modem 1. Thus, the digital modem 1 may transmit at a higher power level and consequently increase the number of codes in a code set while still remaining within the prescribed power limits at the reference point 20.

Figures 2A, 2B:
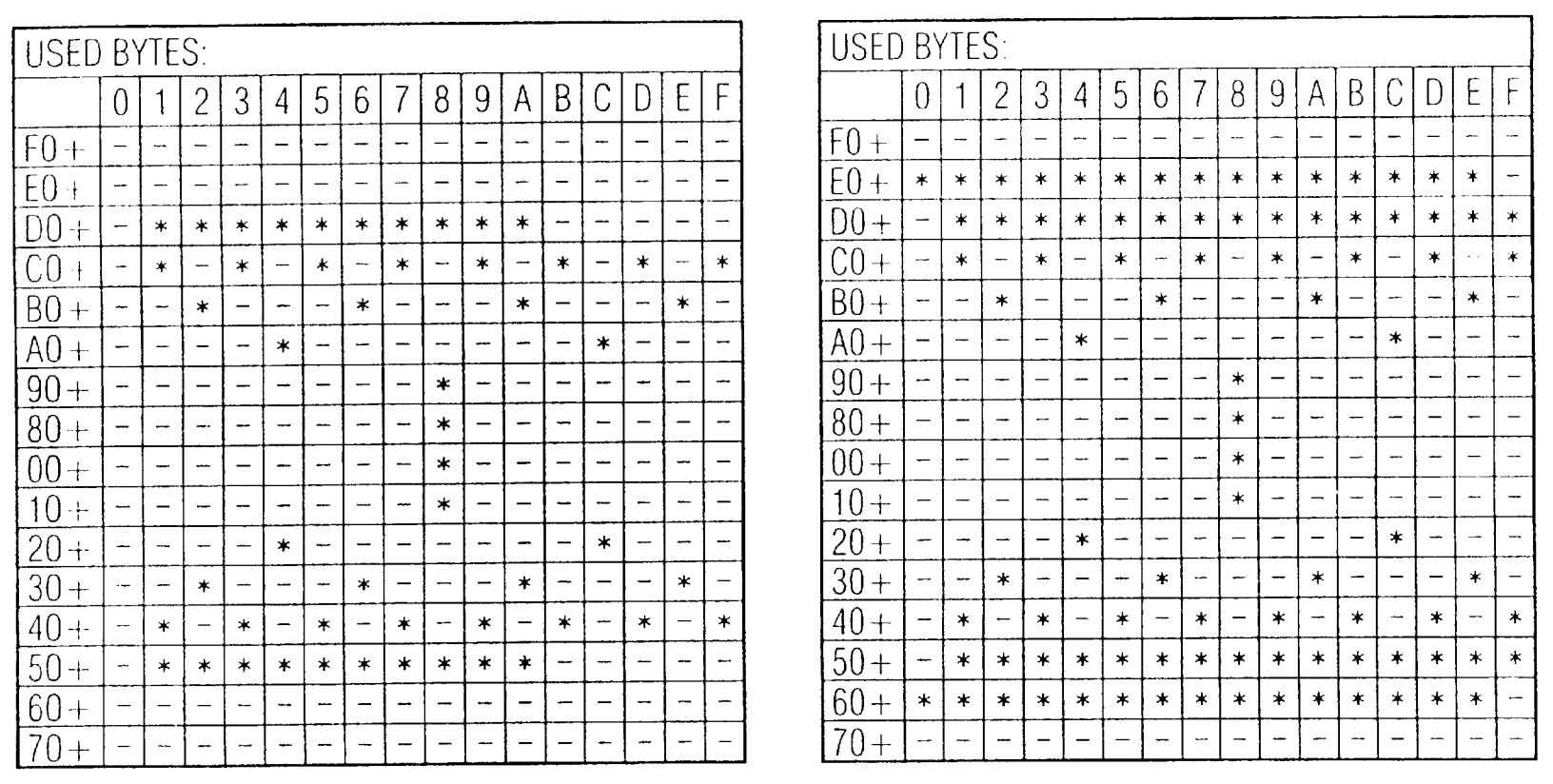

The improvement achieved by the invention is illustrated by FIGS. 2a and 2b. Both FIGS. 2a and 2b show diagrams of code sets used in a data downstream communication complying with the would-be ITU-T recommendation V.90. Every line in each diagram corresponds to one of eight positive and eight negative segments according to the ITU-T recommendation G.711 (or respective U-chords according to V.90 terminology). Each line consists of 16 PCM codes encoded with 8 bits according to G.711 (or 16 U-codes according to V.90 terminology). Lines and columns of both diagrams are denoted with hexadecimal numbering. The code sets are symmetrical around a virtual line between U-chord 00+ and 80+ which line represents a signal level of zero. Signal levels of FF and 7F represent maximum signal levels above and below zero level, respectively. A dash at a diagram position indicates that this particular U-code is not used in this particular code set, whereas an asterisk at a diagram position indicates that this particular U-code belongs to this particular code set. The number of codes in a particular codes set corresponds to the data rate achieved when transmitting data with this code set. The higher the number of codes, the higher the data rate.

Both diagrams of FIGS. 2a and 2b conform to the commonly observed scenario that only a few U-codes are used close to the zero level. The reason is that because of the logarithmic PCM coding scheme of G.711, many more U-codes are available for signal levels close to the zero level than at higher absolute values. Many of the low level codes have a signal level distance to the next U-code which distance is below the minimum signal level distance which can be discriminated safely by the analogue modem receiving the signals.

When the digital modem 1 is encoding data to be transmitted to the analogue modem 5, it uses a variety of scrambling and interleaving techniques prescribed by V.90 and other recommendations in order to make sure that the use of codes within a particular code set during a data transmission period is as evenly distributed as possible. For the purposes of this invention, it may be assumed that all codes of a code set are used with the same probability. Then, the code distribution of a code set represents the power level of a signal transmitted using the code set. Precise details for calculating power levels are outlined in the draft ITU-T recommendation V.90.

Returning to FIG. 2a, it represents a code set diagram measured from a transmission using commercially available modems complying with V.90. Due to the power limit that is imposed on the reference point 20 of FIG. 1, U-chords 70+, 60+, E0+, and F0+ are not used at all for encoding data although the U-codes of these U-chords would be discriminated by the analogue modem 5. The diagram of FIG. 2a shows a code set having 52 PCM codes. This corresponds to a data rate of 45600 bits/s.

On the other hand, FIG. 2b represents a code set diagram according to the invention that results when applying the invention to the transmission path of the configuration of FIG. 2a. Since the power limit imposed on the encoder 7 of the digital modem 1 is elevated, from the power limit set at the reference point 20, by an amount of attenuation introduced by the line interface 3, more U-codes used at higher absolute signal values are possible. The code set diagram of FIG. 2b shows a code set having a total of 92 PCM codes which corresponds to a data rate of 52000 bits/s. Thus, the invention provides an improvement in the data rate from the digital modem 1 to the analogue modem 5 of almost 15%.

The invention may be implemented during the course of communication set-up procedures of a V.90 communication channel. In phase two of the V.90 set-up, a total attenuation as a ratio of transmit power and receive power is determined. A signal B as defined in the ITU-T recommendation V.34 is transmitted by the digital modem 1, which signal B is a steady tone at a given frequency. Before transmitting the signal B, the digital modem 1 informs the receiving analogue modem 5 about the power level it will send in signal B. The analogue modem 5 may then compute the total is linear attenuation over the analogue portion of the signal transmission path between the digital modem 1 and the analogue modem 5.

The total linear attenuation is a composite of the attenuation caused by the DAA 6, the attenuation caused by the subscriber line 4, and the attenuation caused by the line interface 3. While the attenuation caused by the DAA 6 can be determined by the modem 5 from its known circuit configuration, the remaining attenuation caused by the subscriber line 4 and the line interface 3 needs to be determined. The subscriber line portion is estimated such that the remaining line interface portion can be calculated. An attenuation evaluator 21 is provided in the line interface 3 for determining the line interface attenuation and the result is forwarded to the analogue modem 5 for processing. The result is compared with a set of line interface attenuation values stored in a look-up table for a plurality of telephone network operators. An exemplary table is shown below.

| Country of telephone operator | Attenuation value |
| --- | --- |
| Germany, Brazil, Portugal, Luxembourg, South Africa | −10 dB |
| Germany, South Africa, Hong Kong, Commonwealth of Independent States (CIS), Luxembourg, Portugal, Finland, Belgium, Austria, Spain, France, Italy, New Zealand | −7 dB |
| Australia, Denmark, United Kingdom, India | −6 dB |
| Japan | −4 dB |
| The Netherlands | −4.5 dB |
| Norway, Sweden | −5 dB |
| USA | −3 dB/0 dB |

Depending on the telephone network to which the analogue modem 5 is connected, different line interface attenuation values may be obtained. The so-recovered line interface attenuation value will be used in the subsequent step of generating the PCM code set. It is to be noted that the invention does not take into account any non-linear attenuation (i.e. caused by digital PADs) which some network operators impose on portions of the digital transmission network 2. Such attenuations are compensated, for example, by corresponding codec constellation signals as described in the draft V.90.

In phase three of V.90, a minimum signal level distance is determined during training sequences for training the equalizer of the analogue modem 5. This is one basis for obtaining the PCM code set complying with the measured minimum signal distance for a particular connection. Another basis is the allowable power limit at the reference point 20. According to the invention, the power limit is extended by computing the PCM code set on the basis of the power limit at s the reference point 20 plus the attenuation factor introduced by the line interface 3. When the encoder 7 transmits data with such a PCM code set, the power level in the digital signal path 2 exceeds the power limit set at the reference point 20. Due to the attenuation introduced by the line interface 3, the power limit at the reference point 20 will just be met. The analogue modem 5 will thus generate from these measurements an allowable PCM code set for the particular communication path.

The analogue modem 5 sends to the digital modem 1 the PCM code set to be used in the subsequent data session during phase four of the communication set-up procedure. While conventional modems fail to take into account the attenuation caused by the line interface 3 and therefore waste valuable available transmission bandwidth, the invention provides a method to overcome the deficiencies of known systems.

I claim:

1. An improved method of generating a pulse code modulation code set for encoding data with a PCM encoder in a data transmission system having a digital modem with the PCM encoder, a digital signal transmission path, an analogue signal transmission path with a central office line interface portion, and an analogue modem, the improvement which comprises:

determining a minimum signal level distance between adjacent PCM codes of the PCM code set, the minimum signal level distance enabling discrimination by the analogue modem for determining a line interface attenuation of the central office line interface portion; and generating the PCM code set on a basis of a power limit computed by adding the line interface attenuation to a central office line interface power limit.

2. The method according to claim 1, which comprises performing the following steps for determining the line interface attenuation:

determining a total attenuation of the analogue signal transmission path;

subtracting from the total attenuation an attenuation caused by the line interface of the analogue modem of the analogue signal transmission path and an estimate of an attenuation caused by a line portion of the analogue signal transmission path; and finding a nearest possible line interface attenuation from a table including line interface attenuation values respectively prescribed by a plurality of central office operators.

3. The method according to claim 1, which comprises reading the central office line interface power limit from a table having limit values respectively prescribed by a plurality of central office operators.

4. The method according to claim 1, which comprises performing the generating and determining steps with the analogue modem.

5. In a data transmission system having a digital modem with a PCM encoder using a PCM code set for encoding data, a digital signal transmission path, and an analogue signal transmission path with a central office line interface portion, an analogue modem to be operated in the data transmission system, the analogue modem comprising:

means for determining a minimum signal level distance between adjacent PCM codes of the PCM code set, said minimum signal level distance enabling discrimination by the analogue modem;

means for determining a line interface attenuation of the central office line interface portion; and a PCM code set generator generating the PCM code set on a basis of a power limit computed by adding the line interface attenuation to a central office line interface power limit.

6. The modem according to claim 5, further comprising a table having line interface attenuation values respectively prescribed by a plurality of central office operators.

7. The modem according to claim 5, further comprising a table having output power limit values of the line interface respectively prescribed by a plurality of central office operators.

\* \* \* \* \*